(12) United States Patent
Zhang et al.

(10) Patent No.: US 11,887,740 B2
(45) Date of Patent: Jan. 30, 2024

(54) UNLOADING AND TEMPORARY STORAGE DEVICE

(71) Applicant: CHINERGY CO., LTD., Beijing (CN)

(72) Inventors: Haiquan Zhang, Beijing (CN); Junfeng Nie, Beijing (CN); Zuoyi Zhang, Beijing (CN); Hongke Li, Beijing (CN); Xin Wang, Beijing (CN); Jiguo Liu, Beijing (CN); Yujie Dong, Beijing (CN)

(73) Assignee: CHINERGY CO., LTD., Beijing (CN)

( * ) Notice: Subject to any disclaimer, the term of this patent is extended or adjusted under 35 U.S.C. 154(b) by 498 days.

(21) Appl. No.: 17/258,322

(22) PCT Filed: Jul. 31, 2019

(86) PCT No.: PCT/CN2019/098593
§ 371 (c)(1),
(2) Date: Jan. 6, 2021

(87) PCT Pub. No.: WO2020/134076
PCT Pub. Date: Jul. 2, 2020

(65) Prior Publication Data
US 2021/0272712 A1    Sep. 2, 2021

(30) Foreign Application Priority Data
Dec. 29, 2018 (CN) .......................... 201811636610.5

(51) Int. Cl.
*G21C 19/32* (2006.01)
*G21F 5/10* (2006.01)
*G21F 5/015* (2006.01)

(52) U.S. Cl.
CPC ............. *G21C 19/32* (2013.01); *G21F 5/015* (2013.01); *G21F 5/10* (2013.01)

(58) Field of Classification Search
CPC ............ G21C 19/32; G21F 5/10; G21F 5/015
See application file for complete search history.

(56) References Cited

U.S. PATENT DOCUMENTS

| | | | |
|---|---|---|---|
| 4,654,189 A | 3/1987 | Schoening et al. | |
| 2008/0095295 A1* | 4/2008 | Fuls | G21F 5/10 376/272 |
| 2019/0006054 A1 | 1/2019 | Wang et al. | |

FOREIGN PATENT DOCUMENTS

| | | |
|---|---|---|
| CN | 1790552 A | 6/2006 |
| CN | 102855951 A | 1/2013 |
| (Continued) | | |

OTHER PUBLICATIONS

Extended European Search Report from European Application No. 19902303.7 dated Jan. 24, 2022.
(Continued)

*Primary Examiner* — Sean M Luck
(74) *Attorney, Agent, or Firm* — Dorsey & Whitney LLP (57) ABSTRACT

The present application relates to an unloading and temporary storage device. The unloading and temporary storage device includes a stock bin, a stock bin external member, a stock bin internal member, a shielding module and a loading module; the stock bin includes a barrel and a tank body; the stock bin external member includes a cooling water jacket; the stock bin internal member includes a straight bin, an inclined bin and an unloading bin that communicate sequentially; the shielding module includes an external shield and a neutron shield; the loading module includes a loading body; and sphere inlet passages are provided in the loading body. The unloading and temporary storage device can perform the functions of receiving, temporarily storing, atmosphere switching, and unloading of spherical elements,
(Continued)

and also has the safety functions of ensuring geometrical integrity of the spherical elements, radiological protection and residual heat removal.

10 Claims, 5 Drawing Sheets

(56) References Cited

FOREIGN PATENT DOCUMENTS

| | | |
|---|---|---|
| CN | 102881343 A | 1/2013 |
| CN | 105603139 A | 5/2016 |
| CN | 109616235 A | 4/2019 |
| EP | 0022951 B1 | 9/1984 |
| EP | 3399526 A1 | 11/2018 |
| JP | S6049877 B2 | 3/1985 |
| JP | 2007225524 A | 9/2007 |
| JP | 2010223844 A | 10/2010 |
| JP | 2013156133 A | 8/2013 |
| JP | 2013253894 A | 12/2013 |

OTHER PUBLICATIONS

International Search Report from International Application No. PCT/CN2019/098593 dated Oct. 29, 2019.

* cited by examiner

UNLOADING AND TEMPORARY STORAGE DEVICE

CROSS-REFERENCE OF RELATED APPLICATION

The present application is a U.S. National Stage Application of PCT International Application No. PCT/CN2019/098593 filed on Jul. 31, 2019 entitled "Unloading and Temporary Storage Device", which claims priority to Chinese Patent Application No. 201811636610.5, filed on Dec. 29, 2018, entitled "Unloading and Temporary Storage Device", each of which is incorporated herein by reference in its entirety.

FIELD OF TECHNOLOGY

The present application relates to the field of reactor engineering technologies, and particularly to an unloading and temporary storage device.

BACKGROUND

Based on the existing international industrial valve manufacturing technology and level, in order to solve the reliability of the atmosphere switching associated valve during the unloading of spent fuel spherical elements within a life cycle of a nuclear power plant, the temporary storage capacity of the spent fuel spherical elements in the unloading and temporary storage device needs to be increased to be more than 4000, and structures such as vertical shafting system, porous turntable and etc. that are similar to a core unloading device may be adopted to solve problems of the reliability and maintainability of an unloading mechanism in the unloading and temporary storage device.

However, unlike the core unloading device, two working conditions need to be specifically considered for a large-capacity temporary storage device for spent fuel spherical elements. Firstly, the former only performs the core unloading function and does not involve the loading function, the spherical elements can flow continuously and stably into the stock bin from the core and an unloading pipe; while the latter intermittently and unstably performs the functions of receiving, temporarily storing, unloading the spent fuel spherical elements, and collecting debris and dust, and thus the problems of loading reliability and unloading reliability must be considered at the same time, wherein the loading reliability mainly refers to avoiding damage to the spherical elements and the equipment structure caused by loading collision during the loading process. Secondly, the stock bin of the former has a capacity of about 1500 spherical elements, while the latter has a capacity of at least 4,000 spherical elements. Therefore, when it is considered that the special processes for atmosphere switching and unloading and temporary storage are performed, more attention must be paid to the safety issues such as the residual heat removal from a plurality of spent fuel spherical elements and the high-dose γ-ray radiological protection in the unloading and temporary storage device.

SUMMARY

(I) Technical Problem to be Solved

An objective of the present application is to provide an unloading and temporary storage device capable of ensuring the geometrical integrity of spherical elements when receiving the spent fuel spherical elements unloaded from the core, and temporarily storing the spherical elements and reliably performing the safety functions of residual heat removal and γ-ray protection.

(II) Technical Solutions

In order to solve the technical problems above, the present application provides an unloading and temporary storage device, including at least a stock bin, a stock bin external member, a stock bin internal member, a shielding module and a loading module;

the stock bin includes a barrel and a tank body that are disposed sequentially from top to bottom;
the stock bin external member includes a cooling water jacket provided outside the barrel;
the stock bin internal member includes a straight bin provided in the barrel, an inclined bin and an unloading bin provided in the tank body; wherein the straight bin, the inclined bin and the unloading bin communicate sequentially;
the shielding module includes an external shield disposed outside the barrel and a neutron shield disposed outside the external shield;
the loading module includes a loading body disposed at the top of the barrel; wherein sphere inlet passages are provided in the loading body, and a lower end of the loading body is connected with sphere outlet pipelines; one end of the sphere outlet pipeline communicates with the sphere inlet passage, and the other end of the sphere outlet pipeline is in contact with a wall of the barrel, and communicates with the straight bin; the sphere inlet passage and the sphere outlet pipeline form a redirecting flow passage for allowing spherical elements to flow in a redirecting manner.

Specifically, the barrel is connected to the tank body through a tapered section; the tapered section includes a hollow tapered cavity having a larger upper part and a smaller lower part; an upper end of the tapered cavity communicates with the straight bin, and a lower end of the tapered cavity communicates with the inclined bin.

Further, the shielding module further includes an inner shield provided inside the tank body; and the inner shield is disposed at an upper part of the unloading bin.

Further, the loading body includes a supporting plate, a sphere inlet component connected to an upper end of the supporting plate, and a flow-handling component connected to a lower end of the supporting plate; the sphere inlet component is provided with sphere inlet holes, the supporting plate is provided with flow-guiding holes, and the flow-handling component is provided with flow-handling holes; the sphere inlet hole, the flow-guiding hole and the flow-handling hole sequentially communicate to form the sphere inlet passage.

Specifically, the sphere inlet component is further provided with sphere inlet adapter pipes, and the sphere inlet adapter pipes communicate with the sphere inlet holes.

Specifically, the sphere outlet pipeline includes an inclined pipeline and a vertical pipeline that are connected to each other; wherein the inclined pipeline communicates with the sphere inlet passage, and the vertical pipeline is in contact with an inner cylinder wall of the barrel.

Further, an upper end of the barrel is mounted with a feedstock support connected to the loading body; and upper ends of the external shield and the neutron shield are provided with a shield pressure plate connected to the loading body.

Further, the device further includes an unloading mechanism connected to the tank body; and the unloading mechanism includes a power mechanism, a transmission mechanism and an execution mechanism which are sequentially connected from top to bottom.

Specifically, the shielding module further includes a motor shield provided outside the power mechanism.

Further, a bottom guard plate assembly is provided in the unloading bin, and a dust leakage component is provided in the bottom guard plate assembly; the dust leakage component is connected to a dust outlet that is connected to a dust adapter pipe.

(III) Advantageous Effects

The technical solutions above of the present application have the following advantages.

By arranging a cooling water jacket outside the barrel for forced cooling, the unloading and temporary storage device provided by the present application effectively remove the residual heat of the spherical elements in the stock bin, thereby ensuring that the temperatures of the barrel, the chamber and the spherical element are below the design limit. By providing the external shield and the neutron shield sequentially disposed outside the barrel, it is ensured that the surrounding equipment and maintenance personnel are protected from excessive γ-rays and neutron radiation. By communicating the sphere inlet passage and the sphere outlet pipeline to form a redirecting flow passage for allowing the spherical elements to flowing in a redirecting manner, the sphere falling speed can be effectively reduced under the redirecting flow-guiding and guiding actions, and the spherical elements will not be broken after falling, which eliminates the safety hazard.

The unloading and temporary storage device provided by the present application can ensure the geometrical integrity of the spherical elements when receiving the spherical elements unloaded from the core, and can temporarily store the spherical elements and reliably perform the safety functions of residual heat removal and γ-ray protection.

The unloading and temporary storage device provided by the present application can perform the functions of receiving, temporarily storing, atmosphere switching, and unloading of the spherical elements, and also has the safety functions of ensuring the geometrical integrity of the spherical elements, radiological protection and residual heat removal. The device has the advantages of compact structure, high reliability, and convenient maintenance.

In the drawings:
1 spherical element; 100 loading module; 101 supporting plate; 102, flow-handling component; 103 sphere inlet component; 104 sphere inlet hole; 105 flow-guiding hole; 106 flow-handling hole; 107 redirecting flow-limiting track; 108 sphere outlet pipeline; 109 sphere outlet passage; 110 guiding track; 111 rebound track; 112 tumbling track;

200 shielding module; 201 motor shield; 202 external shield; 203 neutron shield; 204 shield pressure plate; 205 inner shield; 206 steel cylinder frame; 207 plumbum shield;

300 stock bin external member; 301 sphere outlet adapter pipe; 302 dust adapter pipe; 303 hoisting ring; 304 first blind plate; 305 air vent nozzle; 306 air inlet nozzle; 307 cooling water inlet; 308, cooling water outlet; 309 sphere inlet adapter pipe; 310 temperature measurement point; 311 pressure measurement point; 312 first disturbance mechanism; 313 second disturbance mechanism; 314 cooling water jacket;

400 stock bin; 401 end flange; 402 bearing sleeve; 403 tank body; 404 second blind plate; 405 tapered section; 406 tapered surface; 407 barrel; 408 inner cylinder wall; 409 feedstock support;

500 stock bin internal member; 501 straight bin; 502 lining cylinder; 503 inclined barrel; 504 inclined bin; 505 secondary baffle; 506 pebble bed; 507 unloading bin; 508 bottom guard plate assembly; 509 dust outlet; 510 spherical element outlet; 511 bottom arc plate; 512 dust leakage component; 513 flow-guiding groove; 514 first debris opening; 515 material guide bridge; 516 second debris opening;

600 unloading mechanism; 601 power mechanism; 602 transmission mechanism; 603 execution mechanism; 604 thrust bearing; 605 shafting system; 606 withdrawal bearing bush; 607 main shaft bearing; 608 turntable assembly; 609 reclaiming hole; 610 scraper.

DETAILED DESCRIPTION

In order to make the objectives, technical solutions, and advantages of the embodiments of the present application clearer, the technical solutions of the embodiments of the present application will be clearly and completely described with reference to the accompanying drawings of the embodiments of the present application. Obviously, the described embodiments are part but not all of the embodiments of the present application. Based on the embodiments of the present application, all other embodiments obtained by a person of ordinary skill in the art without creative efforts shall fall within the protection scope of the present application.

As shown in FIG. 1 to FIG. 6, the embodiments of the present application provide an unloading and temporary storage device, including a loading module 100, a shielding module 200, a stock bin external member 300, a stock bin 400, a stock bin internal member 500, and an unloading mechanism 600.

Figure 1:
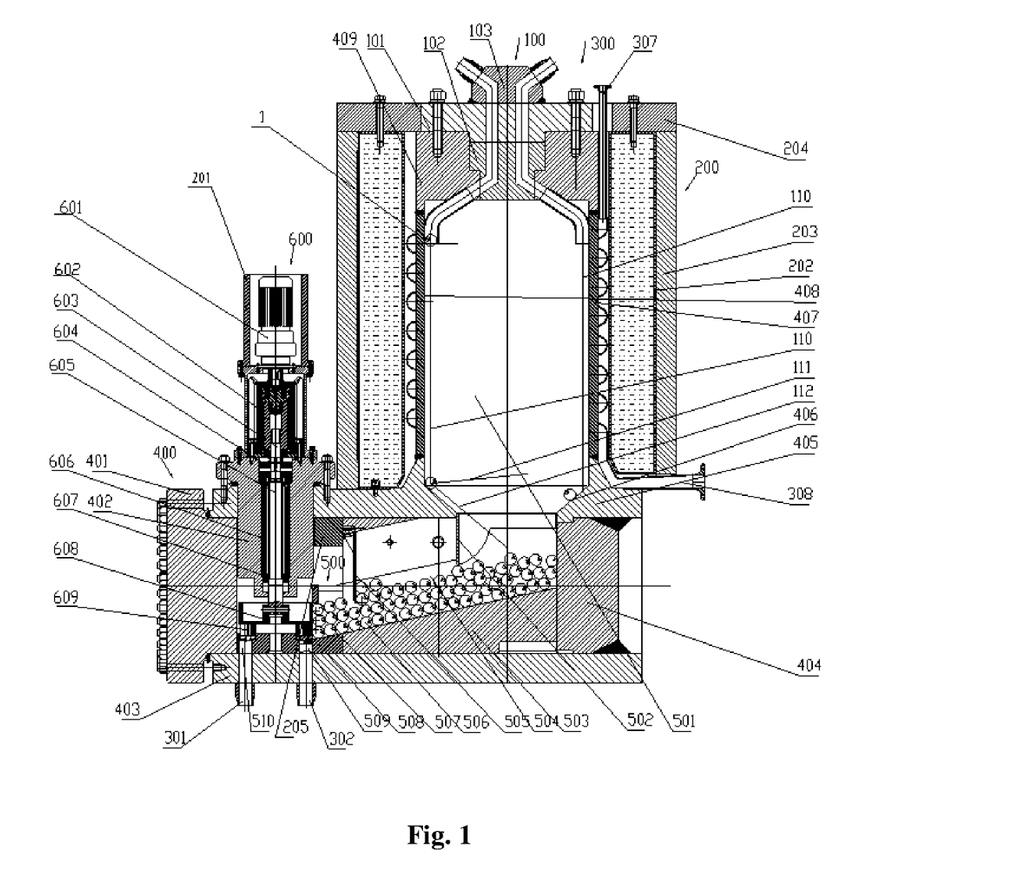
FIG. 1 is a front cross-sectional view of an unloading and temporary storage device according to an embodiment of the present application.

The stock bin 400 is a helium-containing pressure-bearing device composed of an end flange 401, a bearing sleeve 402, a tank body 403, a second blind plate 404 and a barrel 407 that are connected to each other, and is configured to support the loading module 100, the shielding module 200, the stock bin external member 300, the stock bin internal member 500 and the unloading mechanism 600. The barrel 407 is located above the tank body 403, and a transitional tapered section 405 is connected between the tank body 403 and the barrel 407; the tapered section 405 includes a hollow tapered cavity having a larger upper part and a smaller lower part. A feedstock support 409 is also provided at a top of the barrel 407.

The unloading and temporary storage device described in the embodiments of the present application is an important middle-end process equipment between the core fuel cycle and the in-factory storage of the spent fuel spherical elements. Due to the different atmospheres of the core at the front end and the spherical element storage system at the rear end, the spherical elements are continuously conveyed to the spherical element storage system in general, that is, the loading operation is performed after the spherical elements in the temporary storage device are unloaded. Limited by the mounting space, the unloading and temporary storage device needs to adopt a compact and simple structure. For this purpose, the feedstock support 409 is provided at the top of the barrel 407, and can be welded with the barrel 407 in a piece. The barrel 407 is connected to the loading module 100 through the feedstock support 409.

The stock bin internal member 500 includes a straight bin 501 provided in the barrel 407, an inclined barrel 503 provided in the tank body 403, and an unloading bin 507 provided in the tank body 403. An inclined bin 504 is provided in the inclined barrel 503, and the straight bin 501, the inclined bin 504, and the unloading bin 507 communicate in sequence. An upper end of the tapered cavity communicates with the straight bin 501, and a lower end of the tapered cavity communicates with the inclined bin 504. A bottom guard plate assembly 508 is provided in the unloading bin 507, and the bottom guard plate assembly 508 is connected to a left end of the inclined barrel 503. A secondary baffle 505 is hung and connected on a top inner wall of the inclined barrel 503, and the secondary baffle 505 is disposed on the inclined barrel 503 proximal to the unloading bin 507. A lining cylinder 502 is disposed above the inclined bin 504, and the lining cylinder 502 is connected to a bottom inner wall of the tapered section 405. A lower part of the lining cylinder 502 has a curved shovel structure, so as to basically correspond to a curved surface of the inclined bin 504, for forming a sphere flow interception dam.

The straight bin 501, the inclined bin 504, and the unloading bin 507 together form a large-capacity stock bin for temporarily storing the spherical elements on site. In this embodiment, the stock bin has a total capacity of 4,000 spherical elements. Two flow interception dams are formed in the stock bin by using the lining cylinder 502 and the secondary baffle 505, to reduce the pressure of a pebble bed 506 in the stock bin against the unloading mechanism 600. During the rotation of the turntable assembly 608, it is convenient for the spherical elements 1 in the stock bin to smoothly enter a reclaiming hole 609.

The spherical elements 1 unloaded from the core enter the unloading and temporary storage device described in the embodiments of the present application at a certain initial speed after they are firstly subjected to a pneumatic conveyance of helium gas. On the one hand, in this embodiment, the straight bin 501 and the inclined bin 504 have inner space heights of about 2 meters, the spherical elements 1 will have a certain final speed when reaching the bottom of the stock bin or the pebble bed 506. Since the spherical elements 1 have usually been loaded once, cycled for 15 times and unloaded and lifted once, the strength of the spherical elements 1, compared with the initial design restrictions, will be decreased to different degrees after they undergo free falls with different heights, the pneumatic conveyance, and in-core flowing for multiple times. Excessive falling speed of the sphere may cause damage when the spherical element 1 falls directly to the inclined barrel 503. On the other hand, since the spherical elements 1 rebound after colliding with the inclined barrel 503, they will collide with the lower curved-surface shovel of the lining cylinder 502, and easily cause bite when the speed is excessive.

Therefore, in this embodiment, the loading module 100 is provided at the place where the spherical elements enter the unloading and temporary storage device, and is configured to slow down the falling speed of the upstream spherical elements 1 and change their movement tracks to avoid damage caused by collision.

Figure 3:
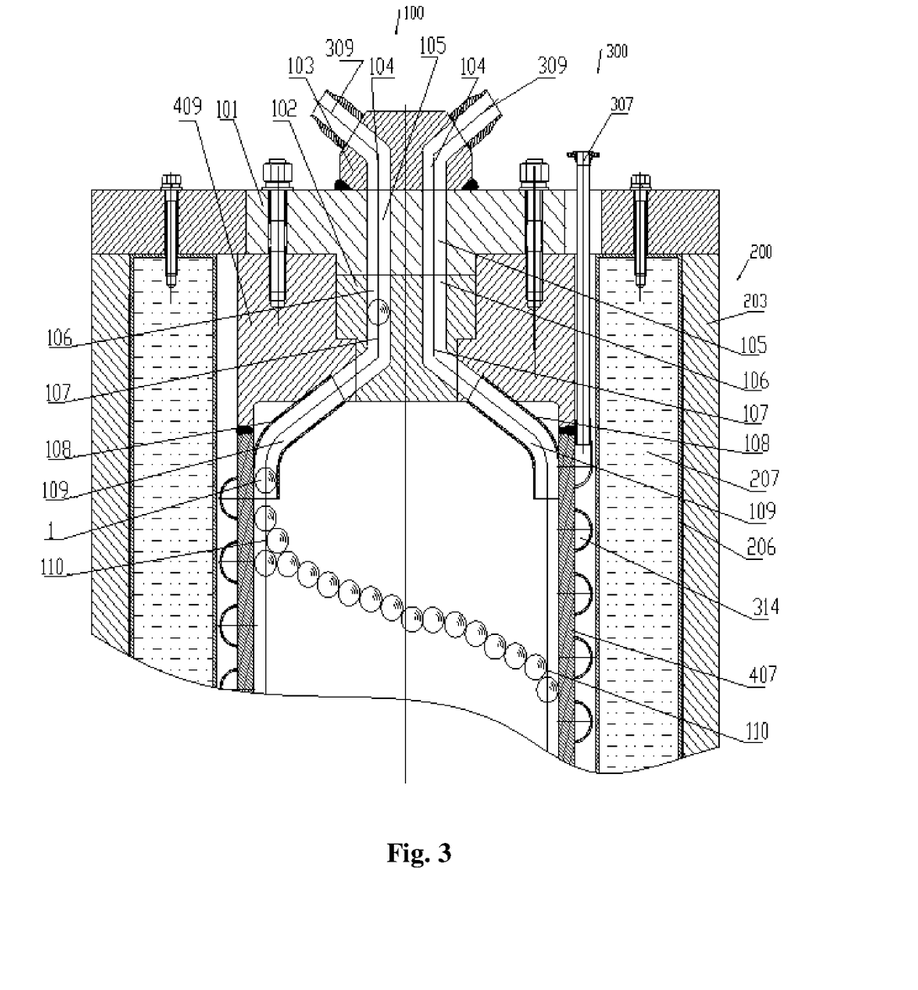
FIG. 3 is a structural schematic diagram of a loading module in the unloading and temporary storage device according to an embodiment of the present application.

The loading module 100 includes a loading body disposed above the barrel 407. Sphere inlet passages are provided in the loading body, and a lower end of the loading body is connected with sphere outlet pipelines 108. One end of the sphere outlet pipeline 108 communicates with the sphere inlet passage, and the other end of the sphere outlet pipeline 108 is in contact with an inner cylinder wall 408 of the barrel 407 and communicates with the straight bin 501.

Wherein, the loading body includes a supporting plate 101, a sphere inlet component 103 connected to an upper end of the supporting plate 101, and a flow-handling component 102 connected to a lower end of the supporting plate 101. The sphere inlet component 103 is provided with sphere inlet holes 104 which are redirecting passages. The supporting plate 101 is provided with flow-guiding holes 105 which are vertical passages. The flow-handling component 102 is provided with flow-handling holes 106 which are redirecting passages. The sphere inlet holes 104, the flow-guiding holes 105, and the flow-handling holes 106 are connected sequentially in equal diameters to form the sphere inlet passages.

Wherein, the sphere inlet component 103 is further provided with sphere inlet adapter pipes 309, and the sphere inlet adapter pipes 309 communicate with the sphere inlet holes 104.

Wherein, the sphere outlet pipeline 108 includes an inclined pipe and a vertical pipe, wherein the inclined pipe communicates with the flow-handling hole 106, and the vertical pipe is in contact with the inner cylinder wall 408 of the barrel 407. The inclined pipe communicates with the vertical pipe to form a redirecting sphere outlet passage 109.

Wherein, the sphere inlet passage and the sphere outlet passage 109 form a redirecting flow passage for allowing the spherical elements 1 to flow in a redirecting manner.

Wherein, the feedstock support 409 is provided with a mounting hole in which the flow-handling component 102 is tightly mounted and the supporting plate 101 is tightly connected to an upper end of the feedstock support 409. The feedstock support 409 is provided with a sphere passing hole, and the sphere inlet passage, the sphere passing hole and the sphere outlet passage 109 sequentially communicate in equal diameters. When the spherical element 1 passes through the sphere inlet passage, the sphere passing hole and the sphere outlet passage 109, the spherical center of the spherical element 1 will draw a three-bent redirecting flow-limiting track 107.

When the spherical element 1 flows along the redirecting flow-limiting track 107, the spherical element 1 collides at the three redirected points since the flow-limiting track 107 is redirected for three times, and a part of the momentum is converted into impulse at each collision, therefore the spherical element 1 is buffered and slowed down each time.

An exit of the sphere outlet passage 109 is disposed tangentially to the inner cylinder wall 408 of the barrel 407. After leaving the sphere outlet passage 109, the spherical element 1 falls by self-weight and inertia under the guiding action of the sphere outlet passage 109, and the falling tracks of the spherical centers draw a guiding track 110. When the spherical element falls to the tapered section 405, a collision occurs at a tapered surface 406 and the spherical elements 1 are buffered and slowed down. The subsequent track of the spherical center may be a rebound track 111 or a tumbling track 112. Wherein, the rebound track 111 may intersect with the wall on the other side, so that the spherical elements 1 again collide with the inner cylinder wall 408 to slow down and fall, or the rebound distance is not enough to reach the inner cylinder wall 408 and the spherical elements 1 fall to the tapered section 405 on the opposite side, and then the spherical elements 1 rebound slightly or rolls off to the inclined bin 504. Regardless of the rebound track 111 or the tumbling track 112, the speed at which the spherical elements 1 finally falls to the inclined bin 504 is lower. The spherical elements roll directly to the unloading bin 507 along the wall surface of the inclined barrel 503, or is slightly rebounded by the wall surface of the inclined bin 504 and then rolls towards the unloading bin 507.

In the present application, the spherical elements drop via the guiding track 110 after the sphere outlet passage 109, compared with the prior art that the spherical elements fall directly from the center via the flow-guiding hole. As shown in the comparative experiments involving both cases, before no pebble bed 506 is formed in the inclined bin 504, there are only 1 or 2 buffers in the prior art, and the damage rate is as high as more than 30%; while in the present application, spherical elements have been buffered for many times and have a damage rate of less than 1%. The reason is that, after the spherical elements 1 are subjected to the mechanical buffering of the sphere inlet component 103, the flow-handling component 102, the sphere outlet pipeline 108, the tapered section 405 and the wall surface of the inclined bin 504, the falling speed of the spherical elements 1 can be effectively controlled and slowed down in general.

The stock bin external member 300 includes at least a cooling water jacket 314 provided outside the barrel 407.

The shielding module 200 includes an external shield 202 provided outside the barrel 407, a neutron shield 203 provided outside the external shield 202, and an inner shield 205 provided inside the tank body. The inner shield 205 is disposed on an upper part of the unloading bin 507. A shield pressure plate 204 is installed on upper ends of the external shield 202 and the neutron shield 203, and the shield pressure plate 204 is connected to the loading body.

For the spherical elements 1 in the large-capacity straight bin 501, the protection against γ-ray and neutron radiation must be considered at the same time. By disposing the external shield 202 and the boron-containing polyethylene neutron shield 203 outside the barrel 407, the safety of the maintenance personnel is ensured. Wherein, the external shield 202 includes a steel cylinder frame 206 and a plumbum shield 207 disposed in the steel cylinder frame 206. The plumbum shield 207 is formed by pouring pure plumbum liquid.

In the unloading and temporary storage device described in this embodiment, the design capacity of the stock bin is 4,000 spherical elements 1. If it is necessary to further reduce the number of valve switching operations of the relevant atmosphere to ensure the service life of the valves, it is possible to increase the design capacity of the stock bin. At the design capacity of 4000 spherical elements 1, according to calculation and analysis, the temperatures of the inner cylinder wall of the barrel 407 and the internal helium will reach 250° C. due to the residual heat of the spherical elements 1, and the temperature at the neutron shield 203 will also exceed 100° C., which will cause the neutron shield 203 to lose support strength due to the layer softening. If the design capacity is increased, the temperatures of the barrel 407 and the neutron shield 203 will be higher, thereby affecting the mechanical strengths of the barrel 407 and the neutron shield 203.

In order to improve the operating condition above, in the embodiments of the present application, a semicircular pipe cooling water jacket 314 is provided on an outer wall of the barrel 407. The cooling water jacket 314 is connected to a cooling water inlet 307 through a water inlet pipeline, and the cooling water jacket 314 is connected to a cooling water outlet 308 through a water outlet pipeline. By providing the cooling water jacket 314, on the one hand, the barrel 407 can be forced cooled by using the cooling water; and on the other hand, the neutron shield 203 is ensured to be not softened due to excessive temperature.

The unloading mechanism 600 includes a power mechanism 601, a transmission mechanism 602 and an execution mechanism 603 which are sequentially connected from top to bottom.

In this embodiment, the power mechanism 601 includes a motor and a speed reducer connected to the motor.

In this embodiment, the transmission mechanism 602 is a magnetic transmission, and the dynamic seal is converted into a static seal using its non-contact soft connection transmission characteristic, so as to achieve a zero leakage sealing of the radioactive helium.

Figure 6:
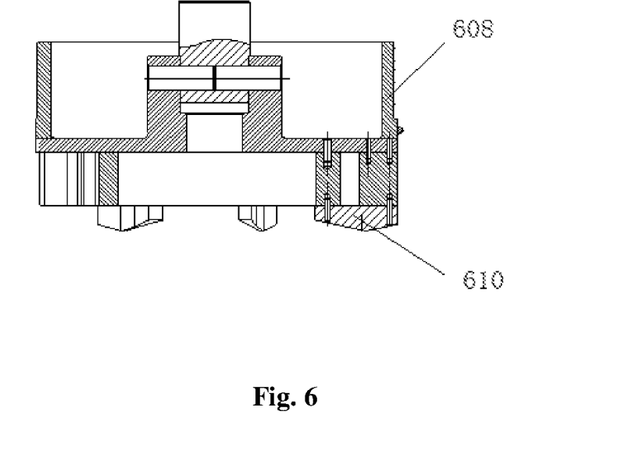
FIG. 6 is a diagram of a turntable assembly in the unloading and temporary storage device according to an embodiment of the present application.

In this embodiment, the execution mechanism 603 includes a vertical shafting system 605 and a turntable assembly 608 with a plurality of reclaiming holes 609. Wherein, the shafting system 605 includes a withdrawal bearing bush 606 which is detachably connected to a main shaft bearing 607.

When the motor drives the shafting system 605 to rotate through the magnetic transmission, the turntable assembly 608 rotates synchronously with it. The plurality of reclaiming holes 609 provided on the turntable assembly 608 can obtain the spherical elements 1 from the pebble bed 506, and unload the spherical elements 1 one by one. In this embodiment, the bearing of the shafting system 605 works at a light load and a low speed, therefore the bearing has a long operating life and operates reliably.

Specifically, the shielding module 200 further includes a motor shield 201 provided outside the power mechanism 601. The motor shield 201 is a steel sleeve that can protect the power mechanism 601 from excessive cumulative γ-ray radiation, thereby prolonging the service life of the power mechanism 601.

Figure 2:
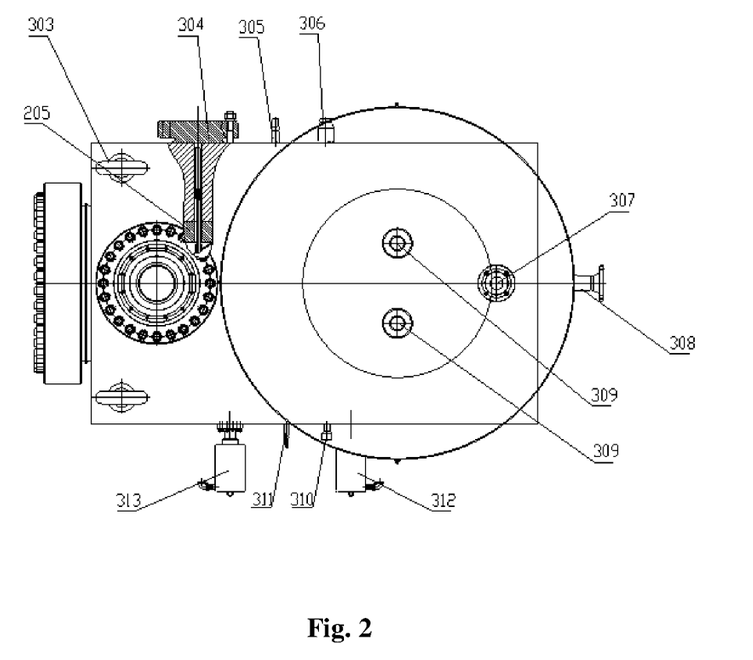
FIG. 2 is a top view of the unloading and temporary storage device according to an embodiment of the present application.

The unloading and temporary storage device described in the embodiments of the present application, unloads material into the device through the HTR-PM dual-reactor unloading pipeline, so two sphere inlet adapter pipes 309 are provided. The two sphere inlet adapter pipes 309 correspondingly communicate with two sphere inlet passages, respectively, and the two sphere inlet passages correspondingly communicate with two sphere outlet pipelines 108, respectively.

For an HTR-PM dual-reactor, it can work in two modes to ensure the operation reliability of the system. One is that, two unloading and temporary storage devices are correspondingly connected to two reactors respectively and perform independent receiving, temporary storage and unloading functions of the spherical elements. The other is that, one unloading and temporary storage device simultaneously performs receiving, temporary storage and unloading functions of the dual-reactor spherical elements.

All spherical elements 1 are finally pneumatically conveyed to the spherical element storage system through the pipeline downstream of the unloading and temporary storage device for in-field temporary storage. During the conveyance process, there is no need to strictly distinguish intact spheres and broken spheres according to shape and size. Therefore, by performing the unloading operation of the spherical elements on the basis of the unloading and temporary storage device described in the application, there is no need to additionally provide an independent damage fuel separator with complete function and complicated structure.

Figure 5:
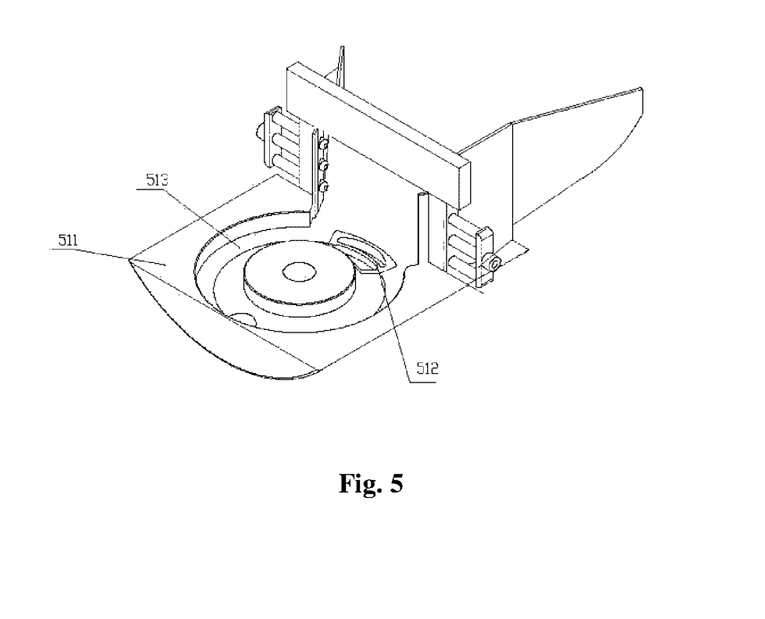
FIG. 5 is a diagram of a bottom guard plate assembly in the unloading and temporary storage device according to an embodiment of the present application.

The bottom guard plate assembly 508 includes a bottom arc plate 511, and an upper surface of the bottom arc plate 511 is provided with a flow-guiding groove 513 that matches the shape of a scraper 610 of the turntable assembly 608. The flow-guiding groove 513 is provided with a spherical element outlet 510 and a dust outlet 509. The spherical element outlet 510 and the dust outlet 509 are disposed on opposite sides of the flow-guiding groove 513. A dust leakage component 512 is further provided in the flow-guiding groove 513 and installed above the dust outlet 509. The dust outlet 509 is connected to a dust adapter pipe 302, and the spherical element outlet 510 is connected to a sphere outlet adapter pipe 301.

Figure 4:
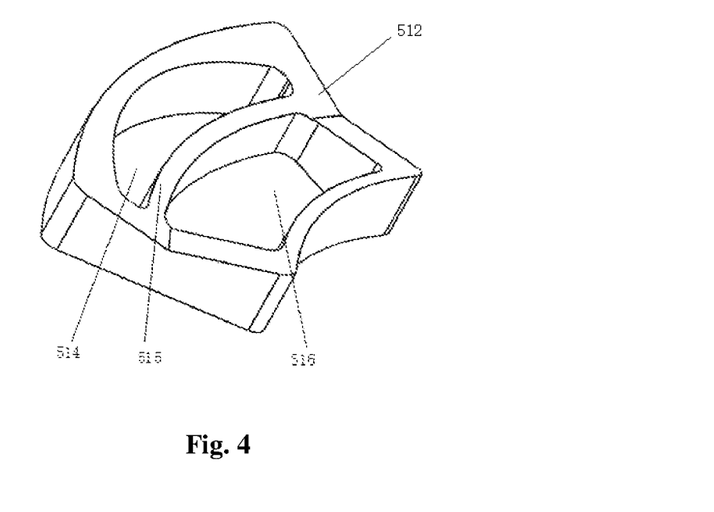
FIG. 4 is a structural schematic diagram of a dust leakage component in the unloading and temporary storage device according to an embodiment of the present application.

The dust leakage component 512 includes a dust leakage component body provided with a first debris opening 514 and a second debris opening 516, and a material guide bridge 515 is provided between the first debris opening 514 and the second debris opening 516. The first debris opening 514 and the second debris opening 516 communicate with the dust outlet 509, respectively.

When the turntable assembly 608 rotates, the spherical elements 1, dust, and debris enter the reclaiming hole 609 under the action of gravity flow. When the rotation continues, the scraper 610 pushes the spherical elements 1 to travel forward, and the dust and debris pass through the first debris opening 514 and the second debris opening 516 of the dust leakage component 512 and enter the dust outlet 509, and then enter the dust adapter pipe 302, and finally leak through the dust adapter pipe 302 into a downstream dust pipe to be collected and temporarily stored.

The stock bin external member 300 further includes a first disturbance mechanism 312 and a second disturbance mechanism 313. The first disturbance mechanism 312 and the second disturbance mechanism 313 are correspondingly installed behind the lining cylinder 502 and the secondary baffle 505, respectively. The first disturbance mechanism 312 and the second disturbance mechanism 313 each include a push rod. Once a connecting arch is formed at two flow interception dams of the lining cylinder 502 and the secondary baffle 505, which causes that the turntable assembly 608 cannot obtain the spherical elements 1, the corresponding electromagnetic driving mechanism can be instructed by the nuclear power plant DCS, and the arch can be broken through disturbance of the push rods to ensure smooth unloading.

In the unloading and temporary storage device described in the embodiments of the present application, the unloading process of the spherical elements includes three stages: stage a, unloading the spherical elements 1 from the core; stage b, receiving, temporarily storing and unloading the spherical elements 1 through the unloading and temporary storage device; and stage c, finally conveying the spherical elements 1 to the spherical element storage system for in-plant temporary storage. Wherein, the environments of stage a and stage c are high-pressure radioactive helium gas in communication with the core and the atmosphere communicating with the outside, therefore in stage b the atmosphere must be switched to ensure the purity of the core helium and avoid the discharge of the radioactive helium into the atmosphere.

For this purpose, the stock bin external member 300 further includes an air inlet nozzle 306, an air vent nozzle 305, a pressure measurement point 311, and a temperature measurement point 310. After the core is isolated from the atmosphere, the air vent nozzle 305 is configured to discharge helium to the helium purification and storage system, and then perform vacuumizing and discharge after the pressure is normal. The air inlet nozzle 306 is configured to supplement helium from the helium purification and storage system. The pressure measurement point 311 and the temperature measurement point 310 are configured to detect the pressure and temperature in the stock bin.

In the unloading and temporary storage device according to the embodiments of the present application, the sphere inlet path is not limited to two paths, and may be one path or more than two paths. In practice, the unloaded material is not limited to the spent fuel spherical elements, and can be other spherical materials. Due to the differences in the quality of the spherical material, the sphere inlet path and the initial speed, the height and inner diameter of the barrel, and the length and angle of the tapered section, the parameters such as the lengths of the flow-guiding hole and the flow-handling hole, the length, angle and direction of the sphere outlet passage, and hence the guiding track can be changed, so that the spherical element collides with the barrel wall, the tapered section and the inclined barrel with different intensities and times for being slowed down and buffered.

In the unloading and temporary storage device described in the embodiments of the present application, the flow-limiting, guiding and buffering effects of the loading module 100 on the spherical elements are mainly directed for the case where there is no spherical element in the inclined bin 504. When there are spherical elements in the inclined bin 504, the pebble bed 506 has a good buffering effect, so that the falling of sphere has little influence on the spherical elements and the equipment.

In the unloading and temporary storage device described in the embodiments of the present application, two sphere inlet paths are provided. Based on the existing design scheme, the working condition that spheres enter the two paths simultaneously will not occur. Therefore, a stacking surface near the discharge hole is formed after full load, and the effective capacity of the barrel is limited to some extent. In the case that spheres enter multiple paths simultaneously, the capacity of the barrel needs to be relatively increased.

In summary, by arranging a cooling water jacket outside the barrel for forced cooling, the unloading and temporary storage device described in the embodiments of the present application effectively removes the residual heat of the spherical elements in the stock bin, thereby ensuring that the temperatures of the barrel, the chamber and the spherical element is below the design limit.

By providing the external shield and the neutron shield sequentially outside the barrel, the unloading and temporary storage device provided by the present application ensures that the surrounding equipment and maintenance personnel are protected from excessive γ-rays and neutron radiation.

The unloading and temporary storage device provided by the present application connects the sphere inlet passage and the sphere outlet pipeline to form a redirecting flow passage for allowing the spherical elements to flow in a redirecting manner, which can effectively reduce the falling sphere speed under the flow-guiding and guiding effect, and the spherical elements will not be broken after falling, which eliminates the safety hazard.

The unloading and temporary storage device provided by the present application can perform the functions of receiving, temporarily storing, atmosphere switching, and unloading of the spherical elements, and can ensure the geometrical integrity of the spherical elements when receiving the spherical elements unloaded from the core, and can temporarily store the spherical elements and reliably perform the safety functions of residual heat removal and γ-ray protection. The device has the advantages of compact structure, high reliability, and convenient maintenance.

In the description of the present application, it should be noted that, the terms "connected with" and "connected to" should be understood in a broad sense unless otherwise specified and limited, for example, they may be fixed connections, detachable connections, or integrated connections; they can be mechanical connections or electrical connections; they can be direct connections or indirect connections through intermediate mediums. For those of ordinary skill in the art, the specific meanings of the above terms in this application can be understood according to specific situations.

In the description of the present application, unless otherwise stated, "several" means one or more; "multiple" means two or more. The orientation or position relations indicated by the terms "upper", "lower", "left", "right", "inner", "outer" and etc. are based on the orientation or position relations shown in the drawings, and are only for the convenience of describing the present application and simplifying the description, rather than indicating or implying that the referred device or element must have a specific orientation, be constructed and operated in a specific orientation, and therefore cannot be understood as limiting the present application.

Finally, it should be noted that the embodiments above are only used to illustrate rather than limit the technical solutions of the present application. Although the present application has been described in detail with reference to the foregoing embodiments, those of ordinary skills in the art should understand that they can still modify the technical solutions described in the various embodiments above, or equivalently replace some of the technical features thereof; and these modifications or replacements do not depart the essence of the corresponding solutions from the spirit and scope of the technical solutions of the various embodiments of the present application.

The invention claimed is:

1. An unloading and temporary storage device, comprising:
   at least a stock bin;
   a stock bin external member;
   a stock bin internal member;
   a shielding module; and
   a loading module;
   wherein the stock bin comprises a barrel and a tank body that are disposed sequentially from top to bottom;
   wherein the stock bin external member comprises a cooling water jacket provided outside the barrel;
   wherein the stock bin internal member comprises a straight bin disposed in the barrel, an inclined bin and an unloading bin disposed in the tank body; wherein the straight bin, the inclined bin and the unloading bin communicate sequentially;
   wherein the shielding module comprises an external shield disposed outside the barrel and a neutron shield disposed outside the external shield; and
   wherein the loading module comprises a loading body disposed at top of the barrel; wherein the loading body includes sphere inlet passages therein, and a lower end connected with sphere outlet pipelines; one end of the sphere outlet pipeline communicates with the sphere inlet passage, and the other end of the sphere outlet pipeline is in contact with a wall of the barrel and communicates with the straight bin; the sphere inlet passage and the sphere outlet pipeline form a redirecting flow passage for allowing spherical elements to flow in a redirected manner.

2. The unloading and temporary storage device of claim 1, wherein the barrel is connected to the tank body through a tapered section; the tapered section comprises a hollow tapered cavity having a larger upper part and a smaller lower part; an upper end of the tapered cavity communicates with the straight bin, and a lower end of the tapered cavity communicates with the inclined bin.

3. The unloading and temporary storage device of claim 1, wherein the shielding module further comprises an inner shield provided inside the tank body; and the inner shield is disposed on an upper part of the unloading bin.

4. The unloading and temporary storage device of claim 1, wherein the loading body comprises a supporting plate, a sphere inlet component connected to an upper end of the supporting plate, and a flow-handling component connected to a lower end of the supporting plate; the sphere inlet component is provided with sphere inlet holes, the supporting plate is provided with flow-guiding holes, and the flow-handling component is provided with flow-handling holes; the sphere inlet hole, the flow-guiding hole and the flow-handling hole sequentially communicate to form the sphere inlet passage.

5. The unloading and temporary storage device of claim 4, wherein the sphere inlet component is further provided with sphere inlet adapter pipes, and the sphere inlet adapter pipes communicate with the sphere inlet holes.

6. The unloading and temporary storage device of claim 4, wherein the sphere outlet pipeline comprises an inclined pipe and a vertical pipe that are connected to each other; wherein the inclined pipe communicates with the sphere inlet passage, and the vertical pipe is in contact with an inner cylinder wall of the barrel.

7. The unloading and temporary storage device of claim 1, wherein an upper end of the barrel is mounted with a feedstock support connected to the loading body; and a shield pressure plate is installed on upper ends of the external shield and the neutron shield, and the shield pressure plate is connected to the loading body.

8. The unloading and temporary storage device of claim 1, further comprising an unloading mechanism connected to the tank body; the unloading mechanism comprises a power mechanism, a transmission mechanism, and an execution mechanism which are sequentially connected from top to bottom.

9. The unloading and temporary storage device of claim 8, wherein the shielding module further comprises a motor shield provided outside the power mechanism.

10. The unloading and temporary storage device of claim 1, wherein a bottom guard plate component is provided in the unloading bin, and a dust leakage component is provided in the bottom guard plate component; the dust leakage component is connected to a dust outlet that is connected to a dust adapter pipe.

\* \* \* \* \*